United States Patent Office  
3,384,648  
Patented May 21, 1968

3,384,648
ORGANOTINOXY SUBSTITUTED
POLYSILOXANES
Kazuo Itoi, Kurashiki, Japan, assignor to Kurashiki Rayon Co., Ltd., Kurashiki, Japan
No Drawing. Filed Oct. 15, 1965, Ser. No. 496,695
Claims priority, application Japan, Dec. 26, 1964, 39/73,358
5 Claims. (Cl. 260—429.7)

ABSTRACT OF THE DISCLOSURE

Vinyl chloride resins are stabilized to provide increased weather resistance, low hygroscopicity and some water repellency by adding thereto up to 1 percent by weight of a liquid polysiloxane compound characterized by structural units in the main chain having the formula

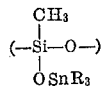

wherein R is an alkyl radical having from 1 to 12 carbon atoms, there being no linkage of ≡Si—H in the molecule.

A novel polysiloxane compound for this purpose is prepared by the reaction of tri-(n-butyl)tin oxide with methylhydropolysiloxane in equimolecular proportions and separating the volatile tri-(n-butyl)tin hydride reaction product from the heavier liquid polysiloxane compound.

---

The present invention relates to a stabilizer for vinyl chloride resins comprising a liquid polysiloxane compound having a structural unit of the formula

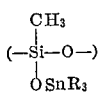

wherein R is an alkyl radical having 1 to 12 carbon atoms, in the main chain of polysiloxane but no linkage of ≡Si—H in the molecule.

Ordinarily, there has been seldom reported a compound having such a linkage of ≡Si—O—Sn≡, but only a report that a compound of R₃SnOSi(CH₃)₃ was obtained by co-hydrolysis of a compound of R₃SnCl with trimethylchlorosilane was published by Ohkawara and others at the XIV Annual Assembly of the Chemical Society of Japan (cf. Abstracts of Lectures at the XIV Annual Assembly of the Chemical Society of Japan, p. 321).

As ≡Si—Cl linkage is apt to be hydrolized to form siloxane linkage, it is difficult in the said method to obtain such a compound as described in the present invention having —O—SnR₃ on the branched chain of polysiloxane. The object of the present invention is to provide a very effective stabilizer for vinyl chloride resins, and more particularly, a stabilizer for vinyl chloride resins consisting of a liquid polysiloxane having the structural unit of

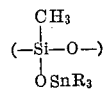

in the main chain of polysiloxane.

The inventor has found that a polysiloxane compound having an optional proportion of the structural unit of

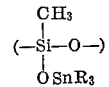

in the main chain can be easily obtained by the equimolar reaction of a silane compound having an optional proportion of the structure of

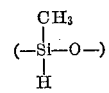

in the main chain of polysiloxane with (R₃Sn)₂O, because the following reaction is carried out quantitatively at room temperature or a lower temperature without using a catalyst and a solvent.

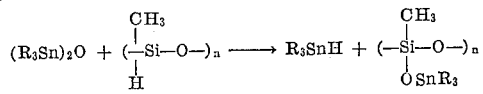

The present inventor's further research has resulted in finding that, the polysiloxane compounds having the structure

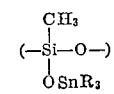

while having no Si—H linkage in the molecule produced as described above is very effective as a stabilizer for vinyl chloride resins.

More precisely, when the ratio of ≡Si—O—Sn≡ linkage of the structural unit of the present invention,

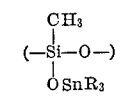

in the main chain of polysiloxane is less than 10 mol precent, it is necessary to add a large amount of the stabilizer due to its descreased stabilizing effect on vinyl chloride resins, so that it is preferable to contain more than 50 mol percent. When ≡Si—H linkage is contained in the stabilizer, the said linkage is not stable, so that it is reacted with R₃SnOSi≡ linkage to form siloxane linkage as shown in Table 1 and Formula 3, on blending with vinyl chloride resin at a high temperature and disadvantageously R₃SnOSi≡ linkage is not only lost but also a three dimensional insoluble and infusible resin is formed, which is hardly blended homogeneously with a vinyl chloride resin.

Methylhydropolysiloxane was mixed with tri-n-butyltin oxide (n-Bu₃Sn)₂O with various molar ratios and distilled under a reduced pressure in nitrogen stream in an oil bath at a temperature from 130° C. to 160° C. The result is shown in Table 1.

TABLE 1

| No. of experiment | 1 | 2 | 3 | 4 | 5 | 6 |
|---|---|---|---|---|---|---|
| Polysiloxane/(n-Bu$_3$Sn)$_2$O molar ratio | 1.0 | 1.5 | 2.0 | 4.0 | 20 | 33. |
| Yield of n-Bu$_3$SnH(percent) [a] | 43.6 | 66.8 | 92.3 | 100 | 92.5 | 100. |
| Degree of cross-linkage of polysiloxane [b] | 0 | 66.7 | 100 | 50 | 10 | 6. |
| Degree of cross-linkage per molecule of polysiloxane [c] | 0 | 33 | 50 | 25 | 5 | 3. |
| State of distillation residue | Liquid | Liquid | Solid | Solid | Solid | Solid. |
| Structural unit of distillation residue [d] | $\begin{array}{c}CH_3\\|\\-Si-O-\\|\\O\\|\\Sn\equiv\end{array}$ | $\begin{array}{c}CH_3\phantom{xxx}CH_3\\|\phantom{xxxx}|\\-Si-O-Si-O-\\|\phantom{xxxxxx}|\\O\phantom{xxxx}OSn\equiv\\|\phantom{xxxx}|\\\phantom{xxx}CH_3\\\phantom{xxxx}|\\-Si-O-Si-\\\phantom{xxxxxx}|\\\phantom{xxxxxx}CH_3\end{array}$ | $\begin{array}{c}CH_3\\|\\-Si-O-\\|\\O\\|\\-Si-O-\\|\\CH_3\end{array}$ | $\begin{array}{c}CH_3\phantom{xxx}CH_3\\|\phantom{xxxx}|\\-Si-O-Si-O-\\|\phantom{xxxxxx}|\\O\phantom{xxxx}O\\|\phantom{xxxx}|\\\phantom{xxx}CH_3\\\phantom{xxxx}|\\-Si-O-Si-O-\\|\phantom{xxxxxx}|\\CH_3\phantom{xxx}O\\\phantom{xxxxxx}|\\\phantom{xxxxxx}Sn\equiv\end{array}$ | | $\begin{array}{c}CH_3\phantom{xxx}CH_3\\|\phantom{xxxx}|\\-Si-O-Si-O-\\|\phantom{xxxxxx}|\\O\phantom{xxxx}H\\|\phantom{xxxx}\\\phantom{xxx}CH_3\\\phantom{xxxx}|\\-Si-O-Si-O-\\|\phantom{xxxxxx}|\\CH_3\phantom{xxx}H\end{array}$ |

[a] The yield is the value based on tin according to formula (2).
[b] Degree of cross-linkage is shown by the number of Si atoms cross-linked by cross-linkage reaction per 100 of Si atoms.
[c] It is the value as presuming the degree of polymerization of methylhydropolysiloxane being 50.
[d] The number of moles of methylhydropolysiloxane was calculated on the basis that one unit of 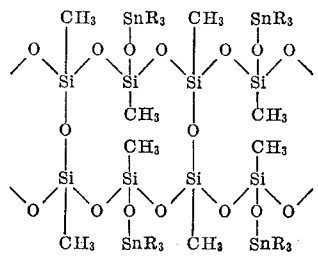 is one mole.

As seen in Table 1, in the molar ratio of 1, the following reaction occurs,

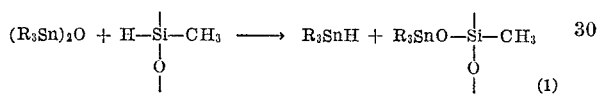
    (1)

and in the molar ratio of 2, the following reaction occurs,

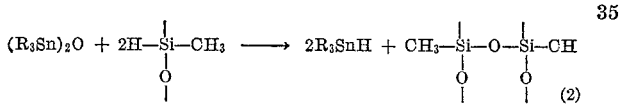
    (2)

and under the above reaction condition, it is apparent that the following reaction occurs.

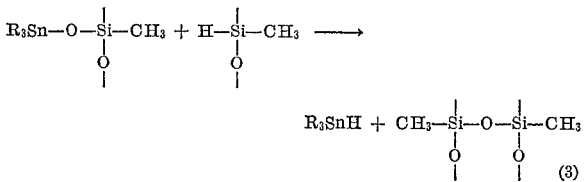
    (3)

Thus, a resin having cross-linkage is obtained.

On comparing the experiment No. 2 with those of Nos. 4 to 6, an interesting fact was found; that is, in Nos. 4 to 6, the compounds were solidified by 3 cross-linkages per macro-molecule, but in No. 2, though a half of siloxane was cross-linked, the compound was still liquid.

The reason of the above fact is as follows: in the experiments of Nos. 4 to 6, as Si adjacent to the cross-linkage is bonded with hydrogen, three dimensional linkage is caused by an irregular reaction due to lack of steric hindrance, but in the experiment of No. 2, all the hydrogens are converted into

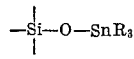

and —O—SnR$_3$ radicals are always attached to Si adjacent to the cross-linked Si alternately in the opposite side due to steric hindrance.

It is considered due to the fact that on reaction of the tin compound with

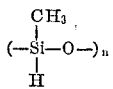

Si reacts every each other to form the following ladder polymer.

$$\begin{array}{ccccccc}
 & CH_3 & & SnR_3 & & CH_3 & & SnR_3 \\
O & | & O & | & O & | & O & | \\
\diagup & Si & \diagdown \diagup & Si & \diagdown \diagup & Si & \diagdown \diagup & Si & \diagdown \\
 & | & & CH_3 & & | & & CH_3 \\
 & O & & & & O & & \\
 & | & & CH_3 & & | & & CH_3 \\
 & Si & & | & & Si & & | \\
\diagdown & | & \diagup \diagdown & Si & \diagup \diagdown & | & \diagup \diagdown & Si & \diagup \\
O & | & O & | & O & | & O & | & O \\
 & CH_3 & & SnR_3 & & CH_3 & & SnR_3
\end{array}$$

Polysiloxane having such a $\equiv$Si—H linkage is cross-linked to form a three dimensional structure, and an insoluble and infusible resin is produced, so that it is disadvantageous that a stabilizer contains such a resin, and it is required to remove the resin by a complete reaction. It is very advantageous that the stabilizer of the present invention is hardly gelled as described above, and it is easily blended with a vinyl chloride resin, as $\equiv$Si—O—SnR$_3$ is cleaved with water or some other content to form a siloxane linkage and keeps it in the liquid form, if cross-linked.

As the stabilizer of the present invention is usually colorless, transparent and liquid, when it is blended with a vinyl chloride resin, the resin is also colorless and transparent. Therefore, it can be used as a stabilizer for transparent polyvinyl chloride products as publicly known stabilizers of an organic tin series. As the stabilizer of the present invention is stable for heat and possesses siloxane linkage and $\equiv$Sn—O—Si$\equiv$ linkage of a low vapor pressure, it is not decomposed by heat or seldom yields disappearance by an elevated temperature, on blending with a vinyl chloride resin. When using the present stabilizer, there can be obtained a vinyl chloride resin possessing an improved weathering resistance with a low hygroscopicity and some water repellency due to the polysiloxane linkage. The present invention is illustrated by the following example.

EXAMPLE (1) *Synthesis of the stabilizer.*—On mixing equal moles of tri-n-butyltin oxide and methylhydropolysiloxane (taking 60 g. as 1 mole) while cooling, an exothermic reaction occurred. When distilling the product in nitrogen stream under a reduced pressure of 5 mm. Hg, tri-n-butyltin hydride formed was distilled off at temperatures near 105° C. and the yield was more than 95%. The distillation residue was a colorless and transparent liquid, and according to the infrared absorption spectrum, there was observed the absorption of ≡SnO—Si≡ at 960–980 cm.$^{-1}$, and it was found that a compound of

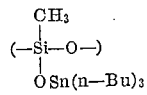

was contained. (n-Bu represents a n-butyl radical).

(2) *Estimation of stabilizing effect.*—After 100 parts of a commercial polyvinyl chloride (Alon P=800), 10 parts of dioctylphthalate and a required amount of the stabilizer were blended with a mixing roll at 150° C. and pre-heated at 150° C. for one minute, and it was pressed for one minute under a pressure of 50 kg./cm. to form a plate for making specimens. These specimens were put in a gear-oven at 180° C. and heat-treated for a given time, and the degree of coloring was observed by eyes to decide the grade, by which the stabilizing effect of the stabilizer was estimated. The result is shown in the following table.

| | Stabilizer | Stabilizer of the present invention | | Dibutyl tin dilaurate | | Lead stearate | Calcium stearate | Barium stearate |
|---|---|---|---|---|---|---|---|---|
| Heating time at 180° C. (min.) | Added parts | 1 | 0.3 | 1 | 0.3 | 1 | 1 | 1 |
| | Mixing time by a mixing roll (min.) | 4 | 2 | 2 | 2 | 8 | 2 | 2 |
| 0 | Color | Colorless | Colorless | Colorless | Colorless | White | Pale orange | Pale orange. |
| | Grade of coloring | | | | | | 1 | 1. |
| 15 | Color | Pale yellow | Yellow | Pale yellow | Yellow | Slightly yellow | Orange | Red. |
| | Grade of coloring | 6 | 4 | 5 | 3 | 7 | 4 | 1. |
| 30 | Color | Yellow | Brown | Yellow | Black brown | Pale yellow | Dark orange | Dark red. |
| | Grade of coloring | 6 | 2 | 5 | 1 | 7 | 4 | 3. |

As seen from the above result, the order of coloring is, lead stearate >the stabilizer of the present invention >dibutyltin dilaurate >calcium stearate >barium stearate and the stabilizer of the present invention shows a little better effect than commercial butyltin dilaurate and is useful in practice.

(3) *Transparency.*—For comparing transparency on the specimens obtained in (2) before and after heat-treatment, each specimen blended with dibutyltin dilaurate and the stabilizer of the present invention was transparent, but the specimens blended with stearates were not.

What I claim is:

1. A stabilizer for vinyl chloride resins consisting essentially of a liquid polysiloxane compound having more than 10 mol percent of a structural unit represented by the formula,

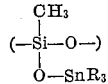

wherein R is an alkyl radical having 1 to 12 carbon atoms, in the main chain of polysiloxane and no ≡Si—H linkage in the molecule, which is obtained by reacting a polysiloxane selected from the group consisting of methyl hydrogen polysiloxane and methyl hydrogen siloxane-dimethyl siloxane copolymer with an organotin compound having the general formula $(R_3Sn)_2O$, wherein R has the same meaning as described above.

2. A stabilizer as set forth in claim 1 wherein the polysiloxane compound contains more than 50 mol percent of the structural unit represented by the formula set forth in claim 1.

3. A stabilizer as set forth in claim 1 wherein R in the polysiloxane compound is n-butyl.

4. A stabilizer for vinyl chloride resin which comprises a liquid polysiloxane compound substantially consisting of a homopolymer of a structural unit represented by the formula

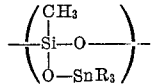

wherein R is an alkyl radical having 1 to 12 carbon atoms.

5. A stabilizer claimed in claim 4, wherein R in the polysiloxane compound is n-butyl.

References Cited

Hiroshi Kataoka, Chem. Abstracts, vol. 55 (1961), p. 10319.

TOBIAS E. LEVOW, *Primary Examiner.*

W. F. BELLAMY, *Assistant Examiner.*